United States Patent Office 3,454,701
Patented July 8, 1969

3,454,701
2 - (PHENYL - AMINO) - 1,3 - DIAZACYCLOPEN-
TENE - (2) SUBSTITUTION PRODUCTS FOR RE-
DUCING BLOOD PRESSURE
Karl Zeile, Karl Heinz Hauptmann, and Helmut Stahle,
Ingelheim am Rhein, Germany, assignors to Boehringer
Ingelheim G.m.b.H., Ingelheim am Rhein, Germany,
a corporation of Germany
No Drawing. Continuation-in-part of application Ser. No.
327,806, Dec. 3, 1963, which is a continuation-in-part
of application Ser. No. 227,527, Oct. 1, 1962. This ap-
plication Dec. 21, 1965, Ser. No. 515,479
Claims priority, application Germany, Oct. 9, 1961,
B 64,319; Oct. 4, 1963, P 144,505
Int. Cl. A61k 27/00
U.S. Cl. 424—273                         10 Claims

ABSTRACT OF THE DISCLOSURE

Therapeutic compositions containing 2-(phenyl-amino)-
1,3-diazacyclopentenes-(2) and their non-toxic, pharma-
cologically acceptable acid addition salts as the active
ingredient, as well as to a method of reducing blood
pressure and inducing sedation in warm-blooded animals.

---

This is a continuation-in-part of copending application
Ser. No. 327,806 filed Dec. 3, 1963, now Patent No.
3,236,857, which in turn is a continuation-in-part of
application Ser. No. 227,527, filed Oct. 1, 1962, now
Patent No. 3,202,660.

More particularly, the present invention relates to
therapeutic compositions containing a compound selected
from the group consisting of substituted 2-(phenyl-
amino)-1,3-diazacyclopentanes-(2).

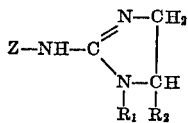

(I)

wherein $R_1$ and $R_2$, which may be identical to or different
from each other, are each selected from the group con-
sisting of hydrogen, methyl and ethyl, and is mono-,
di-, or tri-substituted phenyl selected from the group con-
sisting of trifluoromethyl-phenyl,
2,6-dichloro-phenyl,
2-chloro-6-methyl-phenyl,
2-methyl-4-chloro-phenyl,
2-chloro-4-methyl-phenyl,
2-chloro-4-ethyl-phenyl,
2-chloro-6-ethyl-phenyl,
2-chloro-4-tert.butyl-phenyl,
2,6-dichloro-4-methyl-phenyl,
2,4-dichloro-6-methyl-phenyl,
2,4-dimethyl-6-chloro-phenyl,
2,6-dimethyl-4-chloro-phenyl, and their non-toxic, pharmacologically acceptable acid ad-
dition salts.

The novel compounds embraced by Formula I may be
prepared by a variety of different methods, among which
the following have proved to be most convenient and
efficient:

Method A

By reacting an isothiouronium salt of the formula

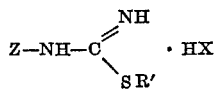

(II)

wherein Z has the same meanings as in Formula I, R' is
lower alkyl and X is the anion of an acid, preferably the
anion of a hydrohalic acid, with an alkylenediamine of
the formula

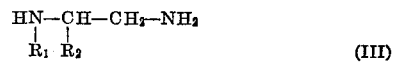

(III)

wherein $R_1$ and $R_2$ have the same meanings as in For-
mula I.

The reaction between the isothiouronium salt II and
the alkylenediamine III is effected by simply heating a
mixture of the reactants to about 100–200° C.

This method leads to satisfactory yields of the desired
end product. In principle, the reaction may also be car-
ried out at relatively low temperatures (60–140° C.) in
the presence of a suitable inert solvent, preferably one
which contains polar groups, such as water or lower
alkanols; however, it was found that under these condi-
tions long reaction periods must be accepted if good
yields are to be achieved. In those instances where Z is
2,6-di-substituted phenyl, even prolonged heating in the
presence of the particular inert solvent leads only to low
yields of the reaction product. Even a variation of the
last-mentioned process, namely, at elevated pressures,
possibly in an atmosphere of an inert gas, does not bring
about an increase in the yield.

The isothiouronium salt II required as one of the start-
ing compounds may, for example, be prepared in known
fashion by heating a thiourea compound obtained from
an analogously substituted anilin and ammonium thio-
cyanate (Houben-Weyl, vol. 9, page 887) with a methyl
compound, such as a methyl halide or dimethyl sulfate,
in the presence of a suitable inert organic solvent, such
as a lower alkanol.

Method B

By reacting a primary amine of the formula $$Z-NH_2 \quad (IV)$$

wherein Z has the same meanings as in Formula I, with a
2-alkyl-mercapto-1,3-diazacyclopentene-(2) of the for-
mula

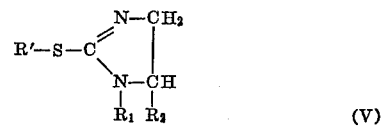

(V)

wherein $R_1$ and $R_2$ have the meanings previously defined
and R' is lower alkyl.

This reaction may be performed in the presence or
absence of an inert solvent. It is important, however,
that a sufficiently high reaction temperature range be
selected in order to drive off the alkylmercaptan released
by the reaction. In general, the temperature range re-
quired therefor is 100–150° C.; however, in individual
cases it may be necessary to heat the reaction mixture to
about 200° C.

The 2-alkylmercapto-1,3-diazacyclopentenes-(2) V used
as starting compounds in this method may themselves be
prepared by alkylation of the corresponding ethylene-
thioureas, as described in Organic Syntheses III, 394.

Method C

By subjecting an N-phenyl-N'-(β-amino-ethyl)-thiourea
or -urea compound of the formula

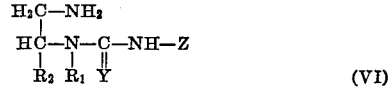

(VI)

wherein $R_1$, $R_2$ and Z have the meanings previously de-
fined and Y is oxygen or sulfur, to a ring closure reaction
by pyrolysis.

The starting compounds VI required for this method may be obtained by reacting a correspondingly substituted phenylisocyanate or phenylisothiocyanate with an ethylenediamine pursuant to the method described in Journal of Organic Chemistry, vol. 24 (1959), page 818.

Method D

By heating a bis-(2-oxo-1-imidazolidinyl)-phosphine chloride of the formula

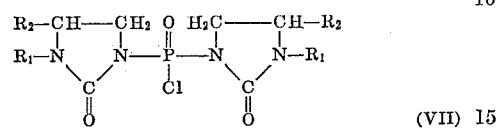

(VII)

wherein $R_1$ and $R_2$ have the meanings previously defined, with a primary amine of the Formula IV above in the presence of an inert organic solvent, such as xylene, to a temperature of about 110–180° C.

The bis-(2-oxo-1-imidazolidinyl)-phosphine chlorides VII required as starting materials for this method may themselves be obtained by reacting a correspondingly substituted imidazolidine-1-one with phosphorus pentachloride in the presence of chloroform as an inert solvent at a temperature of about 20–40° C., as described in Bull. Soc. Chim., France, 1961, page 2114 et seq.

The free bases of the Formula I obtained as end products by any of the methods described above may subsequently be transformed into their non-toxic, pharmacologically acceptable acid addition salts by customary methods, for instance, by acidifying a solution of the free base in a suitable organic solvent with the desired acid.

Examples of specific compounds embraced by Formula I which may be prepared by the above described methods are the following:

2-(2',6'-dichlorophenyl)-amino-1,3-diazacyclopentene-(2)
2-(2'-chloro-4'-methyl-phenyl)-amino-1,3-diazacyclopentene-(2)
2-(2'-methyl-4'-chlorophenyl)-amino-1,3-diazacyclopentene-(2)
2-(2'-chloro-4'-ethyl-phenyl)-amino-1,3-diazacyclopentene-(2)
2-(2'-chloro-6'-ethyl-phenyl)-amino-1,3-diazacyclopentene-(2)
2-(2'-chloro-4'-tert.butyl-phenyl)-amino-1,3-diazacyclopentene-(2)
2-(2'-trifluoro-methyl-phenyl)-amino-1,3-diazacyclopentene-(2)
1-methyl-2-(2',6'-dichlorophenyl)-amino-1,3-diazacyclopentene-(2)
1-methyl-2-(2'-trifluoro-methyl-phenyl)-amino-1,3-diazacyclopentene-(2)
1-methyl-2-(4'-tert.butyl-2-chlorophenyl)-amino-1,3-diazacyclopentene-(2)
1-methyl-2-(2'-chloro-6'-ethyl-phenyl)-amino-1,3-diazacyclopentene-(2)
1-methyl-2-(2'-chloro-4'-methyl-phenyl)-amino-1,3-diazacyclopentene-(2)
2-(2',6'-dichlorophenyl)-amino-4-methyl-1,3-diazacyclopentene-(2)
2-(2'-chloro-4'-methyl-phenyl)-amino-4-methyl-1,3-diazacyclopentene-(2)
2-(2'-chloro-6'-ethyl-phenyl)-amino-4-methyl-1,3-diazacyclopentene-(2)
2-(2'-chloro-6'-methyl-phenyl)-amino-1,3-diazacyclopentene-(2)
2-(2',6'-dichloro-4-methyl-phenyl)-amino-1,3-diazacyclopentene-(2)
2-(2',4'-dichloro-6'-methyl-phenyl)-amino-1,3-diazacyclopentene-(2)
2-(2',4'-dimethyl-6'-chlorophenyl)-amino-1,3-diazacyclopentene-(2)
2-(2',6'-dimethyl-4'-chlorophenyl)-amino-1,3-diazacyclopentene-(2)

The following examples will further illustrate the present invention and enable others skilled in the art to understand it more completely. It should be understood, however, that the invention is not limited to the specific examples given below.

EXAMPLE 1.—Preparation of 2-(2'-chloro-4'-methyl-phenyl)-amino-1,3-diazacyclopentene-(2) by Method A 43 gm. of the thiourea compound (M.P. 124° C.) of the formula

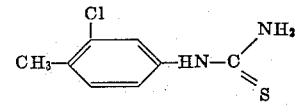

obtained in known fashion from 2-chloro-4-methyl-anilin and ammonium thiocyanate and 20 cc. of methyl iodide were dissolved in 200 cc. of methanol, and the solution was refluxed for two hours. Thereafter, the solvent was evaporated in vacuo, leaving 73.2 gm. of the isothiouronium hydroiodide of the formula

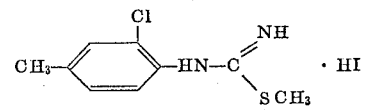

as a residue. This isothiouronium salt was admixed with 20 cc. of ethylenediamine, and the mixture was heated for about 30 minutes at 150–160° C., accompanied by stirring; methyl mercaptan escaped during that time. Subsequently, the reaction mixture was taken up in hot dilute acetic acid, and the resulting solution was made alkaline with 2 N sodium hydroxide. A precipitate formed, which was separated by vacuum filtration, washed with water and dried. It was identified to be 2-(2'-chloro-4'-methyl-phenyl)-amino-1,3-diazacyclopentene-(2) of the formula

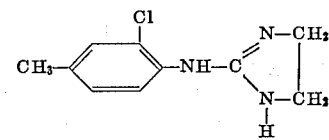

having a melting point of 142–145° C. The yield was 10.2 gm.

The nitrate of the base, obtained by acidifying a solution of the free base with nitric acid, had a melting point of 162–164° C. and was soluble in water and methanol.

Using a procedure analogous to that described above, the following additional substituted phenylamino-1,3-diazacyclopentenes-(2) were prepared:

(a) 2-(2',6'-dichlorophenyl)-amino-4-methyl-1,3-diazacyclopentene-(2) of the formula

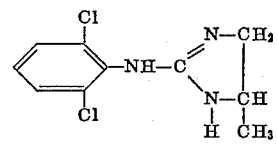

from the isothiouronium salt of the formula

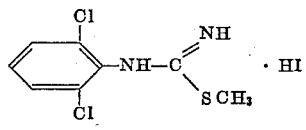

and propylene-1,2-diamine. The hydrochloride of the base had a melting point of 270–271° C.

(b) 2-(2'-methyl-4'-chlorophenyl)-amino-1,3-diazacyclopentene-(2) of the formula

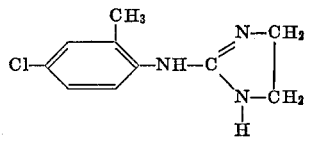

having a melting point of 133° C. from the isothiouronium salt of the formula

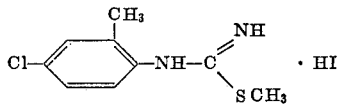

and ethylenediamine. The hydrochloride of the base had a melting point of 199–201° C.

(c) 2-(2'-chloro-4'-ethyl-phenyl)-amino-1,3-diazacyclopentene-(2) of the formula

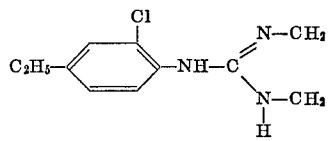

having a melting point of 124–125° C. from the isothiouronium salt of the formula

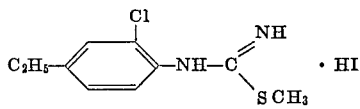

and ethylenediamine. The nitrate of the base had a melting point of 126–127° C.

EXAMPLE 2.—Preparation of 2-(2',6'-dichlorophenyl)-amino-1,3-diazacyclopentene-(2) by Method A 16 gm. of the thiourea compound (M.P. 149° C.) of the formula

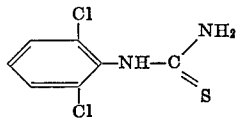

prepared from 2,6-dichloroaniline (produced by the method described in Organic Syntheses III, 262–263) and ammonium thiocyanate, and 16 gm. of methyl iodide were dissolved in 150 cc. of methanol, and the solution was refluxed for two and a half hours. The solvent was then evaporated in vacuo, leaving as a residue 22 gm. of the isothiouronium hydroiodide (M.P. 170° C.) of the formula

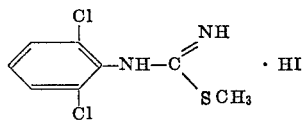

This isothiouronium salt was then admixed with a molar excess (120 mol percent) of ethylenediamine, and the mixture was heated at 130–150° C. for about one hour, accompanied by stirring. Methylmercaptan escaped during that time. The reaction mixture was then taken up in hot dilute acetic acid, and the resulting solution was made alkaline with 2 N sodium hydroxide. The precipitate formed thereby was separated by vacuum filtration, washed with water and dried. It was identified to be 2-(2',6'-dichlorophenyl)-amino-1,3-diazacyclopentene-(2) of the formula

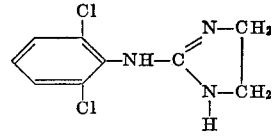

having a melting point of 130° C. The yield was 4.0 gm. Its hydrochloride had a melting point of 305° C.

Using a procedure analogous to that described above, the following additional substituted phenylamino-1,3-diazacyclopentenes-(2) were prepared;

(a) 2-(2'-chloro-6'-methyl-phenyl)-amino-1,3-diazacyclopentene-(2) of the formula

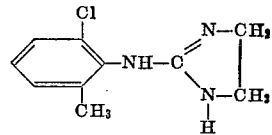

having a melting point of 143–145° C. from the isothiouronium salt of the formula

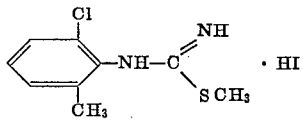

and ethylenediamine. The hydrochloride of the base had a melting point of 217–220° C.

(b) 2-(2'-chloro-4'-tert.butyl-phenyl)-amino - 1,3 - diazacyclopentene-(2) of the formula

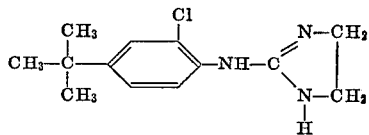

from the isothiouronium salt of the formula

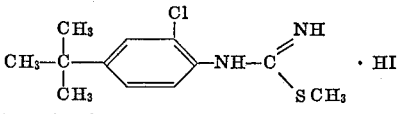

and ethylenediamine. The free base had a melting point of 156–158° C., and its nitrate had a melting point of 129° C.

(c) 2-(2'-chloro-6'-ethyl-phenyl)-amino - 1,3 - diazacyclopentene-(2) of the formula

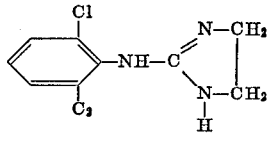

from the isothiouronium salt of the formula

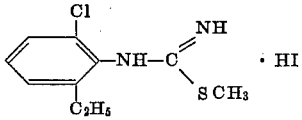

and ethylenediamine.

Example 3.—Preparation of 2-(2'-trifluoromethyl-phenyl)-amino-1,3-diazacyclopentene-(2) by Method A 20.3 gm. of the thiourea compound (M.P. 162–163° C.) prepared in known fashion from o-trifluoromethyl-aniline and ammonium thiocyanate, and 10 cc. of methyliodide were dissolved in 10 cc. of absolute methanol, and the resulting solution was refluxed for two and a half hours. Thereafter, the methanol was evaporated in vacuo, leaving as a residue 23 gm. of the isothiouronium hydroiodide of the formula

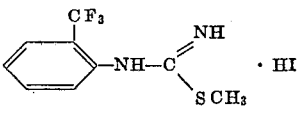

The residue was admixed with 8 cc. of ethylenediamine, and the mixture was heated for about 30 minutes at 150–170° C., accompanied by stirring. Methylmercaptan escaped during that time. The reaction mixture was allowed to cool and was then taken up in dilute hydrochloric acid. The resulting solution was made alkaline with 2 N sodium hydroxide. The precipitate formed thereby, which was identified to be 2-(2'-trifluoromethyl-phenyl)-amino-1,3-diazacyclopentene-(2) of the formula

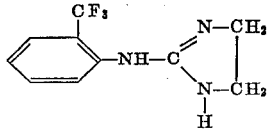

was taken up in chloroform, and the resutling solution was admixed with ethereal hydrochloric acid, whereby a precipitate formed. Precipitation was brought to completion by further addition of ether. 6 gm. of 2-(2'-trifluoromethylphenyl)-amino-1,3-diazacyclopentene - (2) hydrochloride (M.P. 196–198° C.) were obtained.

Example 4.—Preparation of 1-methyl-2-(2',6'-dichlorophenyl)-amino-1,3-diazacyclopentene-(2) by Method A 16 gm. of the thiourea compound (M.P. 149° C.) obtained in known fashion from 2,6-dichloro-aniline and ammonium thiocyanate, and 16 gm. of methyl iodide were dissolved in 150 cc. of methanol, and the solution was refluxed for two and a half hours. Thereafter, the solvent was evaporated in vacuo, leaving as a residue 22 gm. of the isothiouronium hydroiodide (M.P. 170° C.) of the formula

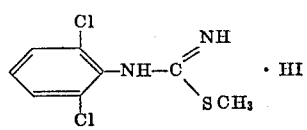

This isothiouronium salt was admixed with 11 cc. of N-methyl-ethylenediamine, and the mixture was heated for about one hour at 180° C., accompanied by stirring. Methylmercaptan escaped during that time. Thereafter, the reaction mixture was taken up in water containing a small amount of dilute hydrochloric acid, and the resulting solution was made alkaline with 5 N sodium hydroxide. The precipitate formed thereby was separated by vacuum filtration, washed with water and dried. 11 gm. of 1-methyl-2-(2',6'-dichlorophenyl)-amino - 1,3 - diazacyclopentene (2) of the formula

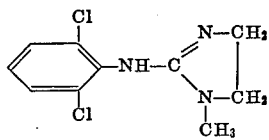

having a melting point of 83° C. were obtained.

The nitrate of the base had a melting point of 226° C. and was soluble in water and ethanol.

Using a procedure analogous to that described above, the following additional substituted 1-methyl-2-phenyl-amino-1,3-diazacyclopentenes-(2) were prepared:

(a) 1-Methyl-2-(2' - trifluoromethyl-phenyl)- amino-1,3-diazacyclopentene-(2) of the formula

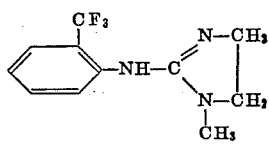

from the isothiouronium of the formula

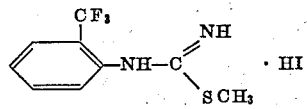

and N-methyl-ethylenediamine. The free base had a melting point of 58–61° C., and its nitrate had a melting point of 182–183° C.

(b) 1-methyl-2-(2'-chloro-4'-methyl-phenyl) - amino-1,3-diazacyclopentene-(2) of the formula

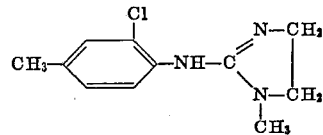

from the isothiouronium salt of the formula

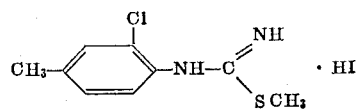

and N-methyl-ethylenediamine.

EXAMPLE 5.—Preparation of 2 - (2',4' - dichloro - 6'-methyl-phenyl)-amino - 1,3 - diazacyclopentene-(2) by Method A A mixture of 12.5 gm. of 2,4-dichloro-6-methyl-aniline (prepared by chlorinating o-toluidine in glacial acetic acid and ferric chloride according to Adams, J.A.C.S. 72, 2454), 170 cc. of water, 37 cc. of concentrated hydrochloric acid and 36.8 gm. of ammonium thiocyanate was refluxed for seven hours. The thiourea compound of the formula

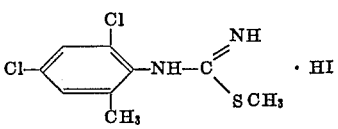

thus obtained was isolated in the manner described in the preceding examples and was recrystallized from ether, whereupon it had a melting point of 183–184° C. Yield: 18 gm.

All of the thiourea compound thus obtained and 33 gm. of methyliodide were dissolved in 300 cc. of methanol, and the solution was refluxed for about three hours. Thereafter, the solvent was evaporated in vacuo, having as a residue the isothiouronium salt of the formula

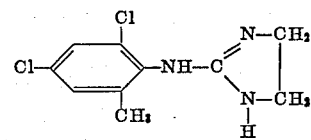

This residue was admixed with 7 gm. of ethylenediamine, and the resulting mixture was heated for about one hour at 180° C., accompanied by stirring, during which time methylmercaptan escaped. The reaction mixture was then taken up in 2 N hydrochloric acid, the resulting solution was extracted with chloroform, the chloroform extract solution was filtered through charcoal, and the filtrate was made weakly alkaline with ammonia. The alkaline solution was then extracted with chloroform, the extract solution was dried and filtered through charcoal, and the chloroform was distilled in vacuo from the filtrate. The residue was identified to be 2-(2',4'-dichloro-6'-methyl-phenyl)-amino-1,3-diazacyclopentene-(2) of the formula The free base was converted into its oxalate by adding an ethanolic solution of oxalic acid, extracting the resulting solution with ether and evaporating the ether from the extract solution. After recrystallization from a mixture of isopropanol and ether the oxalate had a melting point of 261–263° C. Yield: 9.5 gm.

Using a procedure anologous to that described above, the following additional tri-substituted 2-phenylamino-1,3-diazacyclopentenes-(2) were prepared:

(a) 2-(2',6'-dichloro - 4' - methyl-phenyl)-amino-1,3-diazacyclopentene-(2-, M.P. 156° C., of the formula

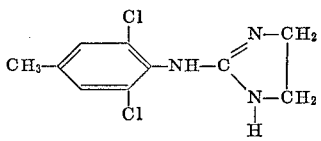

from the isothiouronium salt of the formula

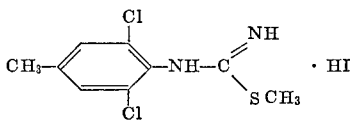

and ethylenediamine.

(b) 2-(2',4'-dimethyl - 6' - chloro-phenyl)-amino-1,3-diazacyclopentene-(2) of the formula

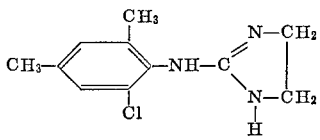

from the isothiouronium salt of the formula

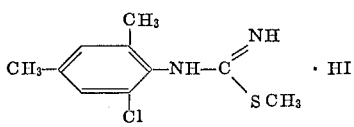

and ethylenediamine. The oxalate of the base had a melting point of 210° C.

(c) 2-(2',6'-dimethyl - 4' - chloro-phenyl)-amino-1,3-diazacyclopentene-(2) of the formula

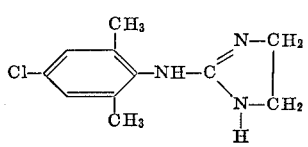

from the isothiouronium salt of the formula

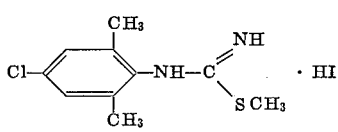

and ethylenediamine. The oxalate of the base had a melting point of 165° C.

The novel phenylamino-1,3-diazacyclopentene-(2) substitution products according to the present invention, that is, the compounds embraced by Formula I above and their non-toxic, pharmacologically acceptable acid addition salts, have useful pharmacodynamic properties. More particularly, the compounds of the present invention exhibit highly effective hypotensive and sedative activities and inhibit the secretion of gastric juice, saliva and sweat in warm-blooded animals.

Typical examples of non-toxic, pharmacologically acceptable acid addition salts of the bases of the Formula I are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, ascorbic acid, 8-chloro-theophylline and the like.

The compounds according to the present invention were tested on human subjects and were found to be highly effective hypotensive agents at daily dosages of 0.1 to 2 mg. For instance, in healthy, normal human test subjects a dose of 0.3 mgm. of 2-(2',6'-dichloro-phenyl)-amino-1,3-diazacyclopentene-(2- produced a drop in the systolic blood pressure of up to 35 mm. Hg which had not completely subsided after twenty-four hours. Approximately the same reduction in blood pressure over the same period of time was achieved by administration of 0.6 mgm. of 2-(2'-chloro-4-methyl-phenyl)-amino - 1,3 - diazacyclopentene-(2) or 0.6 mgm. of 2-(2'-chloro-6'-methyl-phenyl)-amino-1,3-diazacyclopentene-(2). In this connection it should be emphasized that the compounds of the present invention reduce the blood pressure even in normal, healthy humans with normal blood pressure; this is of particular importance because most therapeutically applied hypotensive agents either produce no such effect in humans having normal blood pressure or reduce normal blood pressure only if administered at extremely high dose rates. Further, we have found that considerably lower dosages of the compounds according to the invention are required for treatment of high blood pressure than of most known hypotensive agents. For instance, in oriented clinical tests on high blood pressure patients it was found that a dose of only 0.15 mgm. of 2-(2',6'-dichlorophenyl)-amino-1,3-diazacyclopentene-(2) produces an average reduction of 45 mm. Hg in the systolic blood pressure.

A further advantage of the compounds according to the present invention is their low toxicity. For instance, the $LD_{50}$ of 2-(2',6'-dichlorophenyl)-amino-1,3-diazacyclopentene-(2) in mice is 390 mgm./kg. per os and 127.5 mgm./kg. S.C.; for 2-(2'-chloro-6'-methyl-phenyl)-amino-1,3-diazacyclopentene-(2) it is 180 mgm./kg. per os and 102 mgm./kg. S.C.; and for 2-(2'-chloro-4-methyl-phenyl)-amino-1,3-diazacyclopentene-(2) it is 320 mgm./kg. per os and 42.5 mgm./kg. S.C. These values indicate an extraordinarily favorable therapeutic ratio which assures the safety of the novel compounds in therapeutic applications.

In addition, the compounds of the present invention exhibit effective sedative activities which are already detectable at the hypotensive dosages, but become clearly observable at slightly higher dosages of 0.2 to 5 mg. Thus, a dose of 0.2–0.4 mgm. of 2-(2',6'-dichlorophenyl)-amino-1,3-diazacyclopentene-(2) produced sedation which lasted for six hours, and a dose of 1–2 mgm. produced sedation which persisted for about thirty hours. 0.6–1 mgm. of 2-(2'-chloro-4'-methyl-phenyl)-amino-1,3-diazacyclopentene-(2) induced sedation lasting for five to eight hours, and after administration of 2.4 mgm. of this compound the test subjects slept for about 19 hours. Similar effects were achieved with 2-(2'-chloro-6'-methyl-phenyl)-amino-1,3-diazacyclopentene-(2).

The compounds of the present invention induce a sound and long-lasting sleep from which the patients may, however, be fully awakened at any time. Thus, the novel compounds offer a substantial advantage over customary sleep-inducing sedatives, especially over the barbiturates; for instance, a moderate overdose of such customary sedatives which induces sleep for twenty to thirty hours invariably leads to unconsciousness almost resembling a state of anesthesia for the first few hours, from which the patient can be awakened into a dazed state for brief periods of time only by strong stimulations.

For therapeutic application the compounds of the present invention are administered perorally, rectally or parenterally as active ingredients in dosage unit compositions, that is, in compositions consisting essentially of an inert, physiologically compatible carrier having uniformly distributed therein one dosage unit of the active ingredient. One dosage unit of the compounds of the present invention is from 0.025 to 10 mgm.

The following examples illustrate a few dosage unit compositions comprising a compound of the present invention as the active ingredient. The parts are parts by weight unless otherwise specified.

EXAMPLE 6

Tablets

The tablet composition is compounded from the following ingredients:

| | Parts |
|---|---|
| 2-(2',6'-dichlorophenyl) - amino - 1,3 - diazacyclopentene-(2) | 0.1 |
| Lactose | 54.9 |
| Corn starch | 30.0 |
| Soluble starch | 4.0 |
| Magnesium stearate | 1.0 |
| Total | 90.0 |

The individual ingredients are admixed in customary fashion, and the mixture is pressed into tablets weighing 90 mgm. each. An individual tablet then contains 0.1 mgm. of the active ingredient.

EXAMPLE 7

Solution

The solution is compounded from the following ingredients:

| | Parts |
|---|---|
| 2-(2'-chloro-4'-methyl-phenyl)-amino-1,3-diazacyclopentene-(2) | 0.02 |
| p-benzoic acid methyl ester | 0.07 |
| p-benzoic acid propyl ester | 0.03 |
| Demineralized water q.s.ad 100 parts by vol. | |

The various solid ingredients are dissolved in the demineralized water, and the solution is filled into 100 cc. bottles. Twenty drops of the solution (1 cc.) contain 0.2 mgm. of the active ingredient.

EXAMPLE 8

Hypodermic solution

The solution is compounded from the following ingredients:

| | Parts |
|---|---|
| 2,(2'-chloro-6'-methyl-phenyl)-amino-1,3-diazacyclopentene-(2) nitrate | 0.05 |
| Sodium chloride | 18.0 |
| Distilled water q.s.ad 2000 parts by vol. | |

The active ingredient and the sodium chloride are dissolved in a portion of the distilled water, and the solution is then diluted with distilled water to the required volume. The solution is then filtered until free from fibrous material and is filled into 2 cc. ampules, which are then sterilized and sealed. Each ampule contains 0.05 mgm. of the active ingredient.

EXAMPLE 9

Rectal suppositories

The suppository composition is compounded from the following ingredients:

| | Parts |
|---|---|
| 2-(2',6'-dichlorophenyl)-amino-1,3-diazacyclopentene-(2) | 0.4 |
| Lactose | 244.6 |
| Cocoa butter q.s.ad 1700 parts by vol. | |

The cocoa butter is melted, the active ingredient and the lactose are added, the mixture is allowed to cool slightly and is then homogenized. Thereafter, the composition is poured into cooled suppository molds holding 1700 mgm. each. Every individual suppository contains 0.4 mgm. of the active ingredient.

Although the above dosage unit composition examples illustrate only certain specific compounds of the present invention as active ingredients, it should be understood that any of the other compounds embraced by Formula I or their non-toxic acid addition salts may be substituted in the compositions for those specifically illustrated. Similarly, the amount of the active ingredient in the illustrative compositions may be varied within the indicated dosage range to meet particular requirements and depending upon whether only a hypotensive effect or also a sleep-inducing sedative effect is to be achieved. In the case of hypodermic solutions the active ingredient is preferably provided in the form of a non-toxic acid addition salt.

Pharmacological data

Varying doses of the test compounds were administered intravenously (v. femoralis) to test rabbits under urethane anaesthesia. The variations in mm. Hg in the blood pressure of the rabbits was determined by a mercury monometer connected to their carotid artery. The results are summarized in the following table:

| Test compound | Number of tests | Dosage γ/kg. | Blood pressure change in mm. of Hg |
|---|---|---|---|
| CLAIMED COMPOSITIONS | | | |
| 2-[2',6'-dichlorophenyl]-amino-1,3-diazacyclopentene-(2)-hydrochloride. | 26 | 3 | −10.6 |
| | | 10 | −18.6 |
| | | 30 | −37.1 |
| | | 100 | −50.0 |
| 2-[2'-chloro-4'-methylphenyl]-amino-1,3-diazacyclopentene-(2)-hydrochloride. | 8 | 1 | −1.5 |
| | | 3 | −8 |
| | | 10 | −11.5 |
| | | 30 | −26 |
| 2-[2'-chloro-6'-methylphenyl]-amino-1,3-diazacyclopentene-(2)-hydrochloride. | 9 | 1 | −4 |
| | | 3 | −3.5 |
| | | 10 | −11 |
| | | 30 | −23 |
| | | 100 | −25 |
| 2-[2',4'-dichloro-6'-methyl-phenyl]-amino-1,3-diazacyclopentene-(2)-oxalate. | 6 | 10 | −8 |
| | | 30 | −6 |
| | | 100 | −10 |
| | | 1000 | −18 |
| PRIOR ART OF BLOOM | | | |
| 2-[2',4'-dichlorophenyl]-amino-1,3-diazacyclopentene-(2)-hydrochloride. | 10 | 1 | +4 |
| | | 3 | +12 |
| | | 10 | 0 |
| | | 30 | +8 |
| | | 100 | +23.5 |
| 2-[2',5'-dichlorophenyl]-amino-1,3-diazacyclopentene-(2)-hydrochloride. | 9 | 10 | +28 |
| | | 30 | +37 |
| | | 100 | +46.5 |
| 2-[2'-chlorophenyl]-amino-1,3-diazacyclopentene-(2)-hydrochloride. | 6 | 1 | +7.5 |
| | | 10 | +6 |
| | | 100 | +16 |

The test data of the above table shows that the compositions of the invention have a clear definite hypotensive (blood pressure decrease) effect while the prior art products of Bloom possess just the opposite activity, namely, hypertensive or blood pressure increasing effect.

We claim:

1. A pharmacodynamic composition consisting essentially of an inert, physiologically compatible carrier and from 0.025 to 10 mgm. of a compound selected from the group consisting of 2-phenylamino-1,3-diazacyclopentene-(2) substitution products of the formula

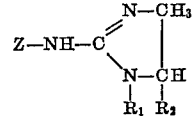

wherein $R_1$ and $R_2$ are each selected from the group consisting of hydrogen, methyl and ethyl, and Z is selected from the group consisting of 2,6-dichlorophenyl,
2-trifluoromethyl-phenyl,
2-chloro-6-methyl-phenyl,
2-methyl-4-chloro-phenyl,
2-chloro-4-methyl-phenyl,
2-chloro-4-ethyl-phenyl,
2-chloro-6-ethyl-phenyl,
2-chloro-4-tert.butyl-phenyl,
2,6-dichloro-4-methyl-phenyl,
2,4-dichloro-6-methyl-phenyl,
2,4-dimethyl-6-chloro-phenyl, and
2,6-dimethyl-4-chloro-phenyl, and their non-toxic pharmacologically acceptable acid addition salts.

2. A composition of claim 1 wherein Z is 2,6-dichlorophenyl and $R_1$ and $R_2$ are hydrogen.

3. A composition of claim 1 wherein Z is 2-chloro-4-methylphenyl and $R_1$ and $R_2$ are hydrogen.

4. A composition of claim 1 wherein Z is 2-chloro-6-methylphenyl and $R_1$ and $R_2$ are hydrogen.

5. A composition of claim 1 wherein Z is 2,4-dichloro-6-methylphenyl and $R_1$ and $R_2$ are hydrogen.

6. The method of reducing the blood pressure in warm-blooded animals, which comprises administering to the said animals an effective amount of a compound selected from the group consisting of 2-phenyl-amino-1,3-diaza-cyclopentene-(2) substitution products of the formula

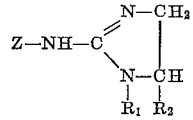

wherein $R_1$ and $R_2$ are each selected from the group consisting of hydrogen, methyl and ethyl, and Z is selected from the group consisting of 2,6-dichlorophenyl,
2-trifluoromethyl-phenyl,
2-chloro-6-methyl-phenyl,
2-methyl-4-chloro-phenyl,
2-chloro-4-methyl-phenyl,
2-chloro-4-ethyl-phenyl,
2-chloro-6-ethyl-phenyl,
2-chloro-4-tert.butyl-phenyl,
2,6-dichloro-4-methyl-phenyl,
2,4-dichloro-6-methyl-phenyl,
2,4-dimethyl-6-chloro-phenyl, and
2,6-dimethyl-4-chloro-phenyl, and their non-toxic, pharmacologically acceptable acid addition salts.

7. The method of claim 6 wherein Z is 2,6-dichlorophenyl and $R_1$ and $R_2$ are hydrogen.

8. The method of claim 6 wherein Z is 2-chloro-4-methylphenyl and $R_1$ and $R_2$ are hydrogen.

9. The method of claim 6 wherein Z is 2-chloro-6-methylphenyl and $R_1$ and $R_2$ are hydrogen.

10. The method of claim 6 wherein Z is 2,4-dichloro-6-methylphenyl and $R_1$ and $R_2$ are hydrogen.

References Cited
UNITED STATES PATENTS

| | | | |
|---|---|---|---|
| 2,899,426 | 8/1959 | Bloom | 260—309.6 |
| 2,899,434 | 8/1959 | Bloom | 260—256.4 |
| 3,202,660 | 8/1965 | Zeile et al. | 260—254 |
| 3,236,857 | 2/1966 | Zeile et al. | 260—309.6 |

FRANK CACCIAPAGLIA, JR., *Primary Examiner.*

J. D. GOLDBERG, *Assistant Examiner.*